(12) United States Patent
Nicholes

(10) Patent No.: US 7,523,717 B2
(45) Date of Patent: Apr. 28, 2009

(54) ANIMAL FEEDER APPARATUS

(76) Inventor: Christopher T. Nicholes, 1016 Canyon Bend Dr., Dripping Springs, TX (US) 78620

( * ) Notice: Subject to any disclaimer, the term of this patent is extended or adjusted under 35 U.S.C. 154(b) by 139 days.

(21) Appl. No.: 11/488,377

(22) Filed: Jul. 18, 2006

(65) Prior Publication Data
US 2007/0039552 A1 Feb. 22, 2007

Related U.S. Application Data

(60) Provisional application No. 60/709,903, filed on Aug. 22, 2005.

(51) Int. Cl.
*A01K 1/10* (2006.01)
*A01K 5/02* (2006.01)

(52) U.S. Cl. ............... 119/51.01; 119/51.11; 119/52.1; 119/53; 119/57.92; 222/638; 222/650; 222/185.1

(58) Field of Classification Search ............... 119/900, 119/901, 902, 51.11, 51.01, 51.02, 51.04, 119/51.15, 52.1, 53, 56.1, 57.1, 57.5, 57.91, 119/57.92; D30/121, 124, 122, 131; 222/638–639, 222/650, 181.1, 181.2, 185.1, 186, 548–549, 222/59
See application file for complete search history.

(56) References Cited

U.S. PATENT DOCUMENTS

| | | | | |
|---|---|---|---|---|
| 763,951 A * | 7/1904 | Bethea | ...................... | 119/61.3 |
| 1,409,434 A * | 3/1922 | Willman | ...................... | 222/650 |
| 3,780,701 A * | 12/1973 | Wentworth, Sr. | ......... | 119/51.01 |
| 4,729,344 A * | 3/1988 | Winkel | ...................... | 119/53.5 |
| 5,370,080 A | 12/1994 | Koepp | | |
| 5,606,934 A * | 3/1997 | Brisby | ...................... | 119/53.5 |
| 6,082,300 A | 7/2000 | Futch | | |
| 6,199,511 B1 * | 3/2001 | Thibault | ...................... | 119/53 |
| 6,557,489 B2 * | 5/2003 | King | ...................... | 119/51.01 |
| 6,681,718 B1 | 1/2004 | McIlarky | | |
| 6,758,163 B1 | 7/2004 | Sternitzky | | |
| 6,761,129 B1 * | 7/2004 | Smith | ...................... | 119/52.1 |
| 6,779,487 B1 | 8/2004 | Kochan | | |
| 7,028,635 B1 * | 4/2006 | Eastman, II | .............. | 119/51.11 |

* cited by examiner

*Primary Examiner*—Andrea M Valenti

(57) ABSTRACT

An animal feeder apparatus includes a food storage hopper which includes a top hopper portion and a bottom hopper portion. A food retainer assembly is attached to the bottom hopper portion, and the food retainer assembly includes a top retainer portion, a bottom retainer portion, and top-to-bottom connection means connected between the top retainer portion and the bottom retainer portion. The top retainer portion includes a top food passage channel, and the bottom retainer portion includes a bottom food passage channel. A timer-controlled food distribution assembly is attached to the bottom retainer portion in registration with the bottom food passage channel, and a stand is provided for supporting the food storage hopper, the food retainer assembly, and the timer-controlled food distribution assembly. The animal feeder apparatus of the invention can be used to attract wildlife at predetermined times that can coincide when a hunter or wildlife photographer is near.

5 Claims, 3 Drawing Sheets

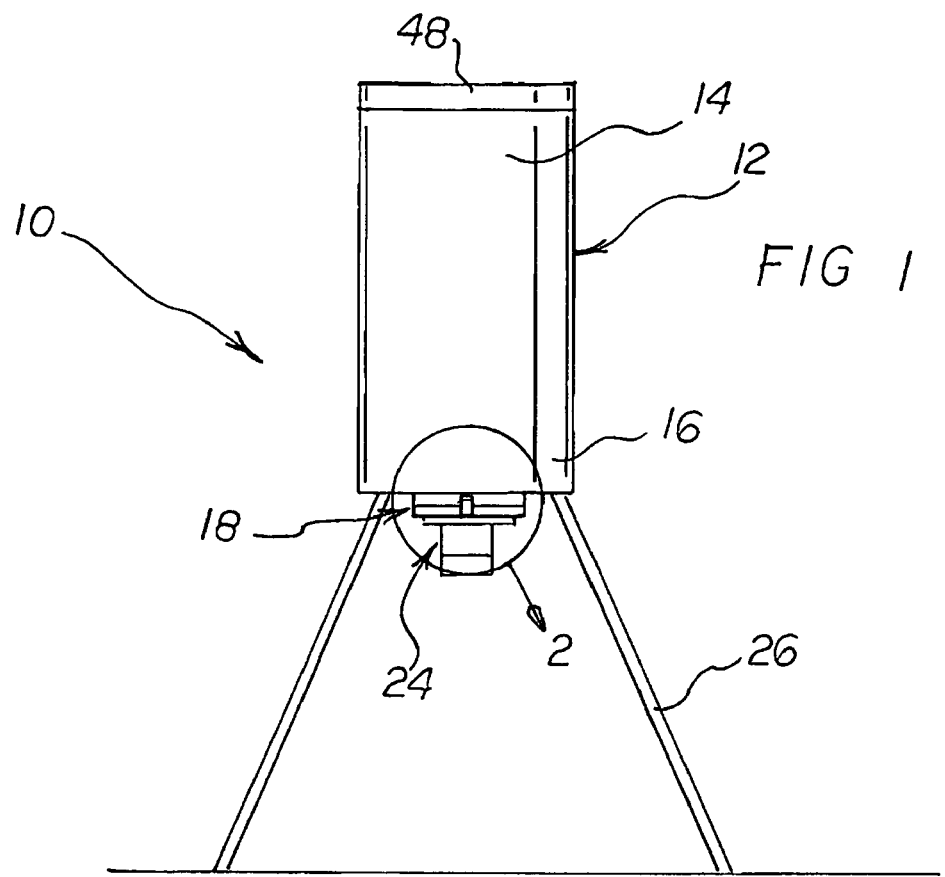
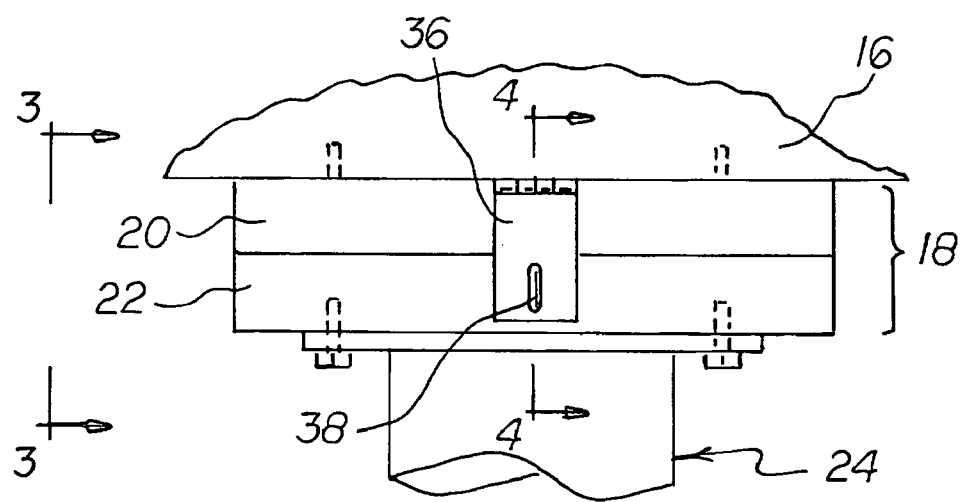

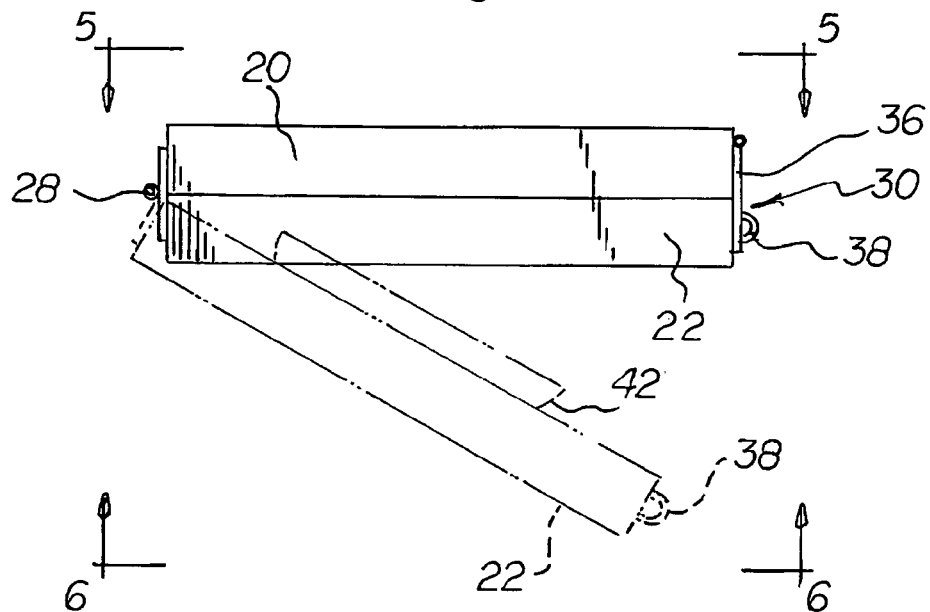
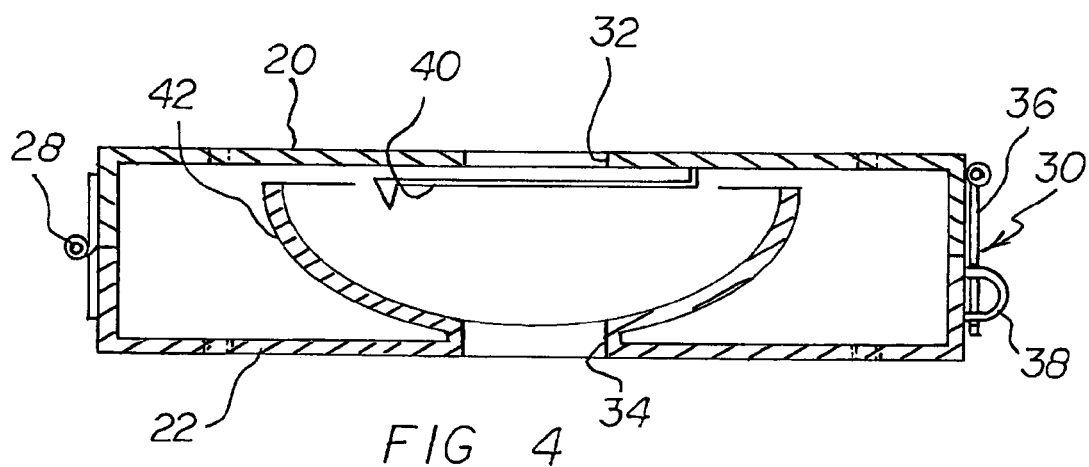

ANIMAL FEEDER APPARATUS

CROSS-REFERENCE TO RELATED APPLICATION

This application claims priority based upon my copending Provisional Application Ser. No. 60/709,903; filed Aug. 22, 2005.

BACKGROUND OF THE INVENTION

1. Field of the Invention

The present invention relates generally to automatic animal feeder apparatuses, and, more particularly, to animal feeder apparatuses which include timers for dispensing animal food.

2. Description of the Prior Art

Automatic animal feeder apparatuses are well known in the art. In this respect, throughout the years, a number of innovations have been developed relating to animal feeder apparatuses, and the following group of Prior Art U.S. patents are representative of those innovations: U.S. Pat. Nos. 5,370,080, 6,082,300, 6,758,163, 6,779,487, and 6,681,718. Each of the above-mentioned Prior Art patents discloses an animal feeding device that provides a hopper and means for automatically dispensing animal food from the hopper. Moreover, a wide variety of additional features are disclosed in the above-mentioned group of Prior Art patents.

However, the inventor of the present invention has conceived of a number of desirable features in an animal feeder apparatus, and the present invention provides such desirable features.

For example, it would be desirable if an animal feeder apparatus were provided which includes a food retainer assembly that is located between a food storage hopper and a timer-controlled food distribution assembly.

Also, it would be desirable if an animal feeder apparatus were provided which includes a stand that supports the food storage hopper, the food retainer assembly, and the timer-controlled food distribution assembly.

In addition, it would be desirable if an animal feeder apparatus were provided which includes a top-to-bottom hinge assembly connected between a first side of a top retainer portion of the food retainer assembly and a first side of a bottom retainer portion of the food retainer assembly.

Also, it would be desirable if an animal feeder apparatus were provided which includes a top-to-bottom lock assembly connected between a second side of the top retainer portion of the food retainer assembly and a second side of the bottom retainer portion of the food retainer assembly.

In addition, it would be desirable if an animal feeder apparatus were provided which includes a top flow valve for controlling flow of food through a top food passage channel in the top retainer portion of the food retainer assembly.

Further, it would be desirable if an animal feeder apparatus were provided which includes a funnel portion for retaining food therein prior to release by the timer-controlled food distribution assembly.

Thus, while the foregoing body of prior art indicates it to be well known to use automatic animal feeder apparatuses, the Prior Art described above does not teach or suggest an animal feeder apparatus which has the following combination of desirable features: (1) includes a food retainer assembly that is located between a food storage hopper and a timer-controlled food distribution assembly; (2) includes a stand that supports the food storage hopper, the food retainer assembly, and the timer-controlled food distribution assembly; (3) includes a top-to-bottom hinge assembly connected between a first side of a top retainer portion of the food retainer assembly and a first side of a bottom retainer portion of the food retainer assembly; (4) includes a top-to-bottom lock assembly connected between a second side of the top retainer portion of the food retainer assembly and a second side of the bottom retainer portion of the food retainer assembly; (5) includes a top flow valve for controlling flow of food through a top food passage channel in the top retainer portion of the food retainer assembly; and (6) includes a funnel portion for retaining food therein prior to release by the timer-controlled food distribution assembly. The foregoing desired characteristics are provided by the unique animal feeder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an animal feeder apparatus which includes a food storage hopper which includes a top hopper portion and a bottom hopper portion. A food retainer assembly is attached to the bottom hopper portion, and the food retainer assembly includes a top retainer portion, a bottom retainer portion, and top-to-bottom connection means connected between the top retainer portion and the bottom retainer portion. The top retainer portion includes a top food passage channel, and the bottom retainer portion includes a bottom food passage channel. A timer-controlled food distribution assembly is attached to the bottom retainer portion in registration with the bottom food passage channel, and a stand is provided for supporting the food storage hopper, the food retainer assembly, and the timer-controlled food distribution assembly.

The animal feeder apparatus of the invention can be used to attract wildlife at predetermined times that can coincide when a hunter or wildlife photographer is near.

Preferably, the top-to-bottom connection means include a top-to-bottom hinge assembly connected between a first side of the top retainer portion and a first side of the bottom retainer portion.

Preferably, the food retainer assembly further includes a top-to-bottom lock assembly which is connected between a second side of the top retainer portion and a second side of the bottom retainer portion. Preferably, the first side of the top retainer portion is opposite to the second side of the top retainer portion, and the first side of the bottom retainer portion is opposite to the second side of the bottom retainer portion.

The top-to-bottom lock assembly can include a top lock member connected to the second side of the top retainer portion and a bottom lock member connected to the second side of the bottom retainer portion. The top retainer portion further includes a top flow valve for controlling flow of food through the top food passage channel.

The bottom retainer portion further includes a funnel portion for retaining food therein prior to release by the timer-controlled food distribution assembly.

The top retainer portion includes top fastener reception channels for receiving fasteners for connecting the top retainer portion to the bottom hopper portion. The bottom retainer portion includes bottom fastener reception channels for receiving fasteners for connecting the timer-controlled food distribution assembly to the bottom retainer portion.

The timer-controlled food distribution assembly includes a timer-controlled distribution valve (not shown) for controlling flow of food from inside the food retainer assembly to outside the food retainer assembly and into the ambient environment.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animal feeder apparatus which has all of the advantages of the prior art and none of the disadvantages.

It is another object of the present invention to provide a new and improved animal feeder apparatus which may be easily and efficiently manufactured and marketed.

It is a further object of the present invention to provide a new and improved animal feeder apparatus which is of durable and reliable construction.

An even further object of the present invention is to provide a new and improved animal feeder apparatus which is susceptible of a low cost of manufacture with regard to both materials and labor, and which accordingly is then susceptible of low prices of sale to the consuming public, thereby making such animal feeder apparatus available to the buying public.

Still yet a further object of the present invention is to provide a new and improved animal feeder apparatus which includes a food retainer assembly that is located between a food storage hopper and a timer-controlled food distribution assembly.

Still another object of the present invention is to provide a new and improved animal feeder apparatus that includes a stand that supports the food storage hopper, the food retainer assembly, and the timer-controlled food distribution assembly.

Yet another object of the present invention is to provide a new and improved animal feeder apparatus which includes a top-to-bottom hinge assembly connected between a first side of a top retainer portion of the food retainer assembly and a first side of a bottom retainer portion of the food retainer assembly.

Even another object of the present invention is to provide a new and improved animal feeder apparatus that includes a top-to-bottom lock assembly connected between a second side of the top retainer portion of the food retainer assembly and a second side of the bottom retainer portion of the food retainer assembly.

Still a further object of the present invention is to provide a new and improved animal feeder apparatus which includes a top flow valve for controlling flow of food through a top food passage channel in the top retainer portion of the food retainer assembly.

Yet another object of the present invention is to provide a new and improved animal feeder apparatus that includes a funnel portion for retaining food therein prior to release by the timer-controlled food distribution assembly.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a front view showing a preferred embodiment of the animal feeder apparatus of the invention.

FIG. 2 is an enlarged front view of a portion of the embodiment of the animal feeder apparatus shown in FIG. 1 that is contained in circled area 2 of FIG. 1.

FIG. 3 is a side view of the embodiment of the animal feeder apparatus of FIG. 2 taken along line 3-3 thereof.

FIG. 4 is a cross-sectional view of the embodiment of the invention shown in FIG. 2 taken along line 4-4 thereof.

DESCRIPTION OF THE PREFERRED EMBODIMENT

With reference to the drawings, a new and improved animal feeder apparatus embodying the principles and concepts of the present invention will be described.

Figure 5:
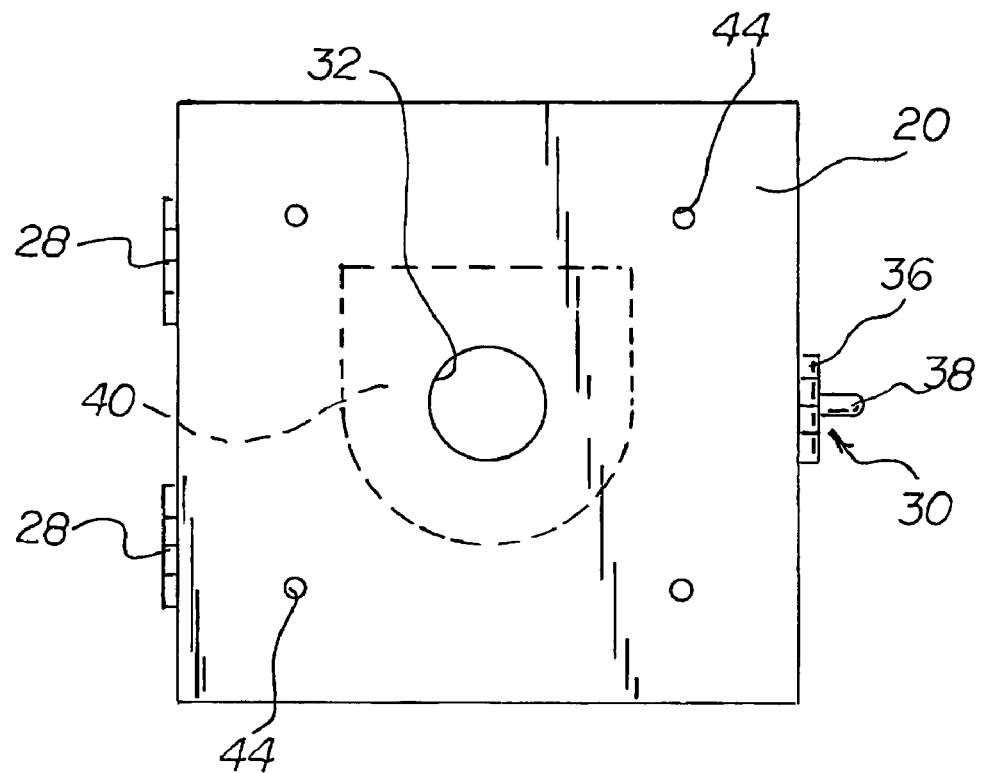
FIG. 5 is a top view of the embodiment of the invention shown in FIG. 4, taken along line 5-5 thereof.
Figure 6:
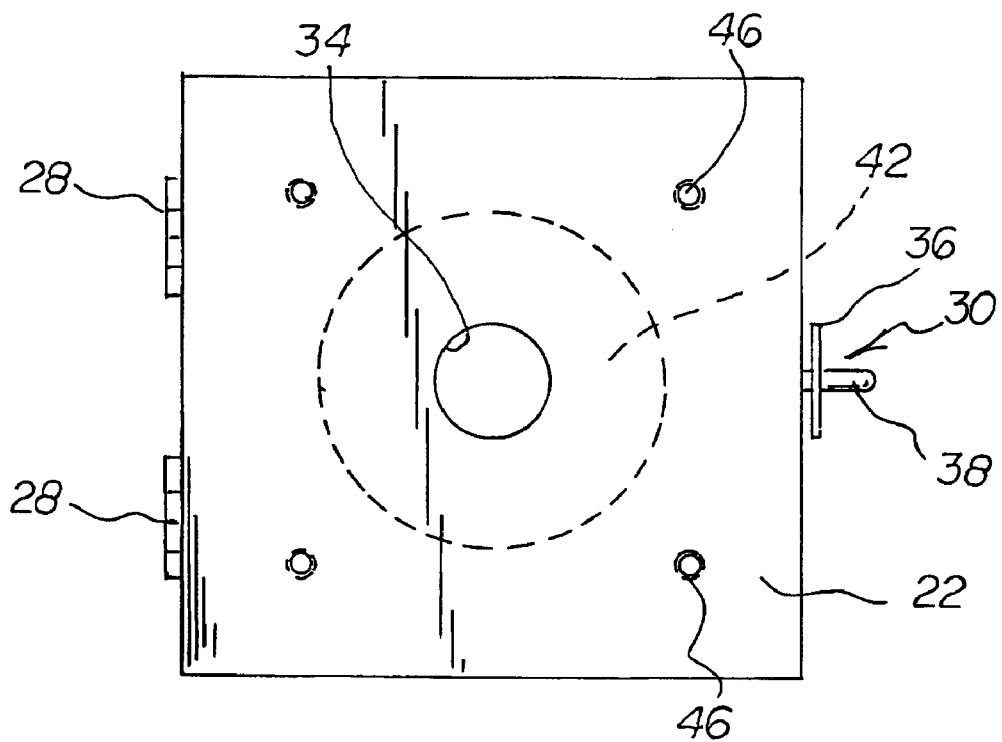
FIG. 6 is a bottom view of the embodiment of the invention shown in FIG. 4, taken along line 6-6 thereof.

Turning to FIGS. 1-6, there is shown a preferred embodiment of the animal feeder apparatus of the invention generally designated by reference numeral 10. In the preferred embodiment, animal feeder apparatus 10 includes a food storage hopper 12 which includes a top hopper portion 14 and a bottom hopper portion 16. A food retainer assembly 18 is attached to the bottom hopper portion 16, and the food retainer assembly 18 includes a top retainer portion 20, a bottom retainer portion 22, and top-to-bottom connection means connected between the top retainer portion 20 and the bottom retainer portion 22. The top retainer portion 20 includes a top food passage channel 32, and the bottom retainer portion 22 includes a bottom food passage channel 34. A timer-controlled food distribution assembly 24 is attached to the bottom retainer portion 22 in registration with the bottom food passage channel 34, and a stand 26 is provided for supporting the food storage hopper 12, the food retainer assembly 18, and the timer-controlled food distribution assembly 24.

Preferably, the top-to-bottom connection means include a top-to-bottom hinge assembly 28 connected between a first side of the top retainer portion 20 and a first side of the bottom retainer portion 22.

Preferably, the food retainer assembly 18 further includes a top-to-bottom lock assembly 30 which is connected between a second side of the top retainer portion 20 and a second side of the bottom retainer portion 22. Preferably, the first side of the top retainer portion 20 is opposite to the second side of the top retainer portion 20, and the first side of the bottom retainer portion 22 is opposite to the second side of the bottom retainer portion 22.

The top-to-bottom lock assembly 30 can include a top lock member 36 connected to the second side of the top retainer portion 20 and a bottom lock member 38 connected to the second side of the bottom retainer portion 22. The top retainer portion 20 further includes a top flow valve 40 for controlling flow of food through the top food passage channel 32.

The bottom retainer portion 22 further includes a funnel portion 42 for retaining food therein prior to release by the timer-controlled food distribution assembly 24.

The top retainer portion 20 includes top fastener reception channels 44 for receiving fasteners for connecting the top retainer portion 20 to the bottom hopper portion 16. The bottom retainer portion 22 includes bottom fastener reception channels 46 for receiving fasteners for connecting the timer-controlled food distribution assembly 24 to the bottom retainer portion 22.

The timer-controlled food distribution assembly 24 includes a timer-controlled distribution valve (not shown) for controlling flow of food from inside the food retainer assembly 18 to outside the food retainer assembly 18 and into the ambient environment.

The animal feeder apparatus 10 of the invention can be used to attract wildlife at predetermined times that can coincide when a hunter or wildlife photographer is near.

The components of the animal feeder apparatus of the invention can be made from inexpensive and durable wood, metal, and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved animal feeder apparatus that is low in cost, relatively simple in design and operation, and which advantageously includes a food retainer assembly that is located between a food storage hopper and a timer-controlled food distribution assembly. With the invention, an animal feeder apparatus is provided which includes a stand that supports the food storage hopper, the food retainer assembly, and the timer-controlled food distribution assembly. With the invention, an animal feeder apparatus is provided which includes a top-to-bottom hinge assembly connected between a first side of a top retainer portion of the food retainer assembly and a first side of a bottom retainer portion of the food retainer assembly. With the invention, an animal feeder apparatus is provided which includes a top-to-bottom lock assembly connected between a second side of the top retainer portion of the food retainer assembly and a second side of the bottom retainer portion of the food retainer assembly. With the invention, an animal feeder apparatus is provided which includes a top flow valve for controlling flow of food through a top food passage channel in the top retainer portion of the food retainer assembly. With the invention, an animal feeder apparatus is provided which includes a funnel portion for retaining food therein prior to release by the timer-controlled food distribution assembly.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. An animal feeder apparatus, comprising:
    a food storage hopper which includes a top hopper portion and a bottom hopper portion,
    a food retainer assembly adapted to be attached to said bottom hopper portion, wherein said food retainer assembly includes a top retainer portion, a bottom retainer portion, and top-to-bottom connection means connected between said top retainer portion and said bottom retainer portion, wherein said top retainer portion includes a top food passage channel, and wherein said bottom retainer portion includes a bottom food passage channel, said top food passage channel of said top retainer portion adapted to be in registration with said bottom hopper portion,
    a timer-controlled food distribution assembly adapted to be attached to said bottom retainer portion in registration with said bottom food passage channel of said bottom retainer portion, and
    a stand for supporting said food storage hopper, said food retainer assembly, and said timer-controlled food distribution assembly,
    wherein said top retainer portion further includes a top flow valve for controlling flow of food through said top food passage channel,
    wherein said bottom retainer portion further includes a funnel portion for retaining food therein prior to release by said timer-controlled food distribution assembly and wherein said funnel portion is in registration with said bottom food passage channel of said bottom retainer portion,
    wherein said top-to-bottom connection means include a top-to-bottom hinge assembly connected between a first side of said top retainer portion and a first side of said bottom retainer portion, and
    wherein said food retainer assembly further includes a top-to-bottom lock assembly connected between a second side of said top retainer portion and a second side of said bottom retainer portion.

2. The apparatus of claim 1 wherein said top-to-bottom lock assembly includes:
a top lock member connected to said second side of said top retainer portion, and
a bottom lock member connected to said second side of said bottom retainer portion.

3. The apparatus of claim 1 wherein:
said top retainer portion has a first side and a second side,
said first side of said top retainer portion is opposite to said second side of said top retainer portion, and
said bottom retainer portion has a first side and a second side, and
said first side of said bottom retainer portion is opposite to said second side of said bottom retainer portion.

4. The apparatus of claim 1 wherein said top retainer portion includes top fastener reception channels for receiving fasteners for connecting said top retainer portion to said bottom hopper portion.

5. The apparatus of claim 1 wherein said bottom retainer portion includes bottom fastener reception channels for receiving fasteners for connecting said timer-controlled food distribution assembly to said bottom retainer portion.

* * * * *